United States Patent [19]

Seymour et al.

[11] Patent Number: 4,474,918

[45] Date of Patent: Oct. 2, 1984

[54] THERMOPLASTIC POLYESTER COMPOSITIONS HAVING IMPROVED BARRIER PROPERTIES

[75] Inventors: Robert W. Seymour; Ronald R. Light, both of Kingsport, Tenn.

[73] Assignee: Eastman Kodak Company, Rochester, N.Y.

[21] Appl. No.: 499,606

[22] Filed: May 31, 1983

[51] Int. Cl.$^3$ ............................................... C08K 5/13
[52] U.S. Cl. ...................................... 524/324; 524/330; 524/333; 524/342; 524/343; 524/348; 524/605; 528/173; 528/176; 528/190; 528/193; 528/195
[58] Field of Search ............... 528/195, 190, 173, 176, 528/193; 524/324, 330, 343, 348, 342, 333, 605

[56] References Cited

U.S. PATENT DOCUMENTS 3,772,405 11/1973 Hamb ................................. 528/195

Primary Examiner—Lester L. Lee
Attorney, Agent, or Firm—Donald W. Spurrell; Daniel B. Reece, III

[57] ABSTRACT

Disclosed are polyester compositions having special utility in film or sheet form having improved gas and water barrier properties, and comprising homo- or copolyesters derived from terephthalic acid or mixtures of terephthalic acid with acids such as isophthalic, 2,6-naphthalene dicarboxylic, and the like, and a glycol component such as ethylene glycol or 1,4-cyclohexanedimethanol, blended with from about 1 to about 30 weight % of certain bisphenols such as bisphenol-A, and naphthalene diols. Films or sheets of these compositions are characterized by having greatly reduced oxygen, carbon dioxide and water vapor permeabilities.

11 Claims, No Drawings

THERMOPLASTIC POLYESTER COMPOSITIONS HAVING IMPROVED BARRIER PROPERTIES

DESCRIPTION

This invention concerns polyester compositions and articles produced therefrom, wherein the polyester material has blended therewith dihydric aromatic additives comprising certain bisphenols and naphthalenediols, which unexpectedly impart improved gas and water vapor barrier properties to films or sheets of said composition. The compositions are especially useful in food packaging applications where good gas and water vapor barrier properties are highly desirable.

The polyesters useful herein have inherent viscosities prior to compounding with the additive of from about 0.4 to about 1.0, preferably from about 0.55 to about 0.80 and are prepared from an acid component comprising one or more of terephthalic acid (TPA), isophthalic acid (IPA), 2,6-naphthalenedicarboxylic acid (NDA), and 1,4-cyclohexanedicarboxylic acid (CHDA), and a glycol component comprising one or more aliphatic or aromatic diols including the $C_2$-$C_{12}$ aliphatics such as ethylene glycol (EG); propylene glycol; diethylene glycol; 1,2-propylene glycol; 2,4-dimethyl-2-ethylhexane-1,3-diol; 2,2,4-trimethyl-1,3-pentanediol; 2,2-dimethyl-1,3-propanediol; 2-ethyl-2-butyl-1,3-propanediol; 2,2-diethyl-1,3-propanediol; 2-methyl-2-propyl-1,3-propanediol; 2-ethyl-2-isobutyl-1,3-propanediol; 1,3-butanediol; 1,4-butanediol; 1,5-pentanediol; 1,6-hexanediol; 2,2,4-trimethyl-1,6-hexanediol; 1,2-cyclohexanedimethanol; 1,3-cyclohexanedimethanol; 1,4-cyclohexanedimethanol (CHDM); 2,2,4,4-tetramethyl-1,3-cyclobutanediol; o-, m-, and p-xylylene diols; 4,4'-sulfonyldiphenol; 4,4'-oxydiphenol; 4,4'-isopropylidenediphenol; 2,7- and 2,5-naphthalenediol. Preferred glycol components comprise ethylene glycol or 1,4-cyclohexanedimethanol, and mixtures thereof in any proportion, and up to about 30 mole % of other glycol. It is noted that when ethylene glycol is used, diethylene glycol is present in amounts of from about 0.5 to about 5.0 mole % based on total moles of the ethylene glycol present. Preferred other glycols are 1,4-butanediol, neopentyl glycol, 2,2,4-trimethyl-1,3-pentanediol, 1,6-hexanediol, and 1,3-propanediol.

The polyesters can be produced according to conventional processes, e.g., with a catalyst, with or without the introduction of an inert gas stream, as solution condensation in a solvent, as a melt condensation or azeotroic esterification, at temperatures of up to about 250° C., or higher so that the water or alkanol produced by the esterification is continuously removed. The esterification takes place almost quantitatively and can be followed by measuring the hydroxyl and acid numbers. The esterification temperature may be selected so that the losses of volatile substances remain small, i.e., during at least the first period of the esterification the process is conducted at a temperature below the boiling point of the lowest-boiling starting substance. The term "acid" as used herein, e.g., terephthalic acid (TPA), includes the condensable derivatives of such acids such as esters and acid chlorides, particularly dimethylterephthalate.

A typical polyester preparation is as follows:
145.5 grams (0.75 mole) dimethylterephthalate,
89.0 grams (1.44 moles) ethylene glycol,
32.8 grams (0.23 mole) 1,4-cyclohexanedimethanol, and
120.0 ppm Ti as titanium tetraisopropoxide, are added to a 500-ml. round-bottom flask fitted with a stirrer, condensate take-off, and nitrogen inlet head. The flask and contents are immersed in a Woods metal bath at approximately 170° C. and the temperature raised to 195° C. and maintained for two hours and twenty minutes while ester exchange and esterification of the dimethylterephthalate, ethylene glycol, and 1,4-cyclohexanedimethanol takes place. The temperature is then raised to 285° C. During all of the above reactions, a nitrogen purge of approximately two cubic feet/hour is maintained over the reactants. At 285° C., the melt is placed under 0.10 mm. vacuum and polycondensation continued for 50 minutes. The resulting polymer has an inherent viscosity of about 0.739.

The inherent viscosities (I.V.) of the polyesters herein are determined according to ASTM D2857-70 procedure in a Wagner Viscometer of Lab Glass Inc. of Vineland, N.J. having a ½ ml. capillary bulb, using a polymer concentration of 0.5% by weight in 60/40 by weight, phenol/tetrachloroethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta)^{25° C}_{0.50\%} = \frac{\ln\left(\frac{t_s}{t_o}\right)}{C}$$

where:
($\eta$)=Inherent viscosity at 25° C. at a polymer concentration of 0.5 g./100 ml. of solvent;
ln=Natural logarithm;
$t_s$=Sample flow time;
$t_o$=Solvent-blank flow time; and
C=Concentration of polymer in grams per 100 ml. of solvent=0.50.

The present additives which are used at about 1–30%, preferably from about 3 to about 20% by wt. levels based on polyester weight, include other positional isomers of naphthalenediol in addition to the 2,7-isomer, and the bisphenols generally represented by the formula

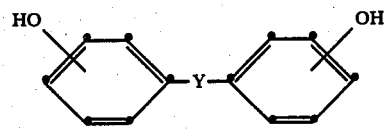

wherein Y is

—SO$_2$—, or —S—.

Compounds such as phosphites, which deactivate the polyester catalyst and thus retard interchange of the additive with the polymer chain, may also be included in the compositions.

The present invention is defined as a polyester composition and its use in film or sheet form having improved gas and water barrier properties, comprising polyester material having an I.V. of from about 0.4 to about 1.0 derived from terephthalic acid or mixtures of terephthalic acid with up to about 50 mole % of one or more of isophthalic acid, 2,6-naphthalenedicarboxylic acid, and 1,4-cyclohexanedicarboxylic acid, and a glycol component comprising ethylene glycol or 1,4-cyclohexanedimethanol or mixtures thereof in any proportion, and up to about 30 mole % of other glycol, said polyester having blended therewith from about 1 to about 30% by weight of an additive component comprising one or more naphthalenediols and/or bisphenols of the formula

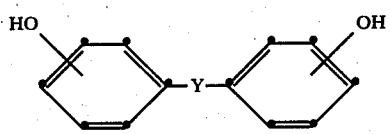

wherein Y is

—$SO_2$—, or —S—.

In preferred embodiments of the invention, the acid is terephthalic, the glycol component is ethylene glycol or 1,4-cyclohexanedimethanol, or mixtures thereof in any proportion, up to 5.0 mole % of diethylene glycol, and wherein the other glycol consists of one or more of 1,4-butanediol, neopentylglycol, 2,2,4-trimethyl-1,3-pentanediol, 1,6-hexanediol, and 1,3-propanediol, and the additive component is present in a concentration of from about 3 to about 20% by weight.

The present compositions are prepared by mixing the additive with the polyester by conventional melt blending equipment such as compounding extruders or Banbury mixers. Film or sheet material may be formed, e.g., directly from the melt blend or from preformed pellets.

If desired, conventional additives such as dyes, pigments, stabilizers, plasticizers, fillers, and the like, may be added to the compositions in typical amounts.

This invention and its unobviousness will be further demonstrated by the following examples although it will be understood that these examples are included merely for purposes of illustration and are not intended to limit the scope of the invention.

In the examples, oxygen permeability is calculated in cubic centimeters of $O_2$ permeating a 1-mil thick sample, per 100 inches square, over a 24-hour period under an $O_2$ partial pressure difference of one atmosphere at 30° C. using a MoCoN OX-TRAN 100 instrument and is reported as $cm^3$-mil/100 $in^2$-24 hours-atm. Carbon dioxide permeability is determined and reported in the same manner but on a MoCoN PERMATRAN-C instrument. Water vapor transmission rate (WVTR) is calculated in grams of water permeating a film of 1 mil thickness and 100 $in^2$ area over a 24-hour period and is determined on the same type sample at 100° F. and 90% relative humidity in a MoCoN PERMATRAN-W instrument, and is reported as g-mil/100 $in^2$-24 hours. These instruments and detailed instruction manuals for their use are supplied to the industry by Modern Controls, Inc., of Minneapolis, Minn. The film actually used to measure permeability varies between about 3 to 8-mils in thickness, and the permeability is converted to a 1 mil basis in known manner. The compositions used in the examples are compounded by extrusion and extruded into film using a Brabender extruder at 240°-270° C.

EXAMPLE 1

Each of bisphenol-A, 4,4'-sulfonyl-di-phenol, and 2,7-naphthalenediol were mixed at various levels with PETG (the amorphous polyester of TPA, 69 mole % EG, and 31 mole % CHDM, having an I.V. of about 0.75) and extruded into film 2- to 5-mils thick on a Brabender extruder. Oxygen and $CO_2$ permeabilities, and WVTR were determined as above and the results are shown in Tables 1-3. A surprising improvement in the barrier properties of PETG with relatively low levels of additive are evident. For example, as shown in Table 1, a greater than 7-fold reduction in $O_2$ permeability (3.0) was obtained with only 15 wt. % of 2,7-naphthalenediol. Similar unexpected improvements occurred in the $CO_2$ permeability, as shown for various levels of bisphenol-A in Table 2. Table 3 shows a significantly reduced WVTR.

TABLE 1

| Conc. of Each Additive in Wt. % | $O_2$ Permeabilities For | | |
|---|---|---|---|
| | Bisphenol A | 4,4'-Sulfonyl Diphenol | 2,7-Naphthalene Diol |
| 0 | 22.4 | 22.4 | 22.4 |
| 5 | 12.3 | 12.1 | 9.6 |
| 10 | 8.1 | — | — |
| 15 | 5.2 | 7.0 | 3.0 |
| 20 | 3.5 | — | — |

TABLE 2

| | $CO_2$ Permeability For Bisphenol-A | | | | |
|---|---|---|---|---|---|
| Wt. % Bisphenol A | 0 | 5 | 10 | 15 | 20 |
| Permeability | 90 | 48 | 34 | 21 | 17 |

TABLE 3

| Conc. of Each Additive in Wt. % | Water Vapor Transmission Rates For | | |
|---|---|---|---|
| | Bisphenol A | 4,4'-Sulfonyl Diphenol | 2,7-Naphthalene Diol |
| 0 | 3.0 | 3.0 | 3.0 |
| 5 | 2.3 | 2.7 | 2.4 |
| 10 | 2.1 | — | — |
| 15 | 1.4 | 2.2 | 1.8 |

EXAMPLE 2

Bisphenol-A, 4,4'-sulfonyldiphenol and 2,7-naphthalenediol were mixed at various levels with PET, a poly(ethyleneterephthalate) of I.V. of about 0.72, and extruded into 2- to 5-mil. film on a Brabender extruder. Oxygen permeabilities and water vapor transmission rates were determined as shown in Tables 3 and 4 respectively. Surprisingly, these values were significantly reduced relative to the unmodified control, even at 5% additive. This example further demonstrates the unexpected properties of these additive/polymer compositions.

TABLE 4

| Conc., of Each Additive in Wt. % | $O_2$ Permeabilities For | | |
|---|---|---|---|
| | Bisphenol A | 4,4'-Sulfonyl Diphenol | 2,7-Naphthalene Diol |
| 0 | 10.6 | 10.6 | 10.6 |
| 5 | 7.6 | 6.6 | 5.7 |
| 10 | 4.7 | — | — |
| 15 | 3.6 | — | — |

TABLE 5

| Conc., of Each Additive in Wt. % | Water Vapor Transmission Rates For | | |
|---|---|---|---|
| | Bisphenol A | 4,4'-Sulfonyl Diphenol | 2,7-Naphthalene Diol |
| 0 | 3.2 | 3.2 | 3.2 |
| 5 | 2.9 | 2.8 | 2.0 |
| 10 | 2.3 | — | — |
| 15 | 2.0 | — | — |

The invention has been described in detail with particular reference to preferred embodiments thereof, but it will be understood that variations and modifications can be effected within the spirit and scope of the invention.

We claim:

1. A polyester composition having improved gas and water barrier properties, an I.V. of from about 0.4 to about 1.0, and being the reaction product of an acid component comprising terephthalic acid or mixtures of terephthalic acid with up to about 50 mole % of one or more of isophthalic acid, 2,6-naphthalenedicarboxylic acid, or 1,4-cyclohexanedicarboxylic acid, and a glycol component comprising ethylene glycol or 1,4-cyclohexanedimethanol or mixtures thereof in any proportion, and up to about 30 mole % of other glycol, said polyester having blended therewith in nonreacted form from about 1 to about 30% by weight of an additive component comprising one or more naphthalenediols and/or bisphenols of the formula

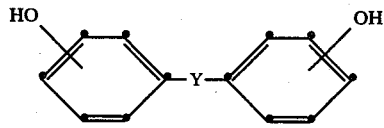

wherein Y is

—$SO_2$—, or —S—.

2. A composition according to claim 1 wherein the glycol component is ethylene glycol or 1,4-cyclohexanedimethanol, or mixtures thereof in any proportion, and up to 5.0 mole % of diethylene glycol.

3. A composition according to claim 2 wherein said other glycol consists of one or more of 1,4-butanediol, neopentylglycol, 2,2,4-trimethyl-1,3-pentanediol, 1,6-hexanediol, and 1,3-propanediol.

4. A composition according to claim 3 wherein the acid is terephthalic.

5. A composition according to claim 1 wherein the acid is terephthalic and the glycol component is ethylene glycol, from about 10 to about 25 mole % 1,4-cyclohexanedimethanol, and from about 0.5 to about 5.0 mole % diethylene glycol.

6. A composition according to claim 1 containing from about 3 to about 20% by weight of said additive component.

7. A composition according to claims 2, 3, 4 or 5 wherein the additive is bisphenol-A.

8. A composition according to claims 2, 3, 4 or 5 wherein the additive is 4,4'-sulfonyl-diphenol.

9. A composition according to claims 2, 3, 4 or 5 wherein the additive is 2,7-naphthalenediol.

10. A sheet or film of the composition of claim 1.

11. A sheet or film of the composition of claims 1, 2, 3, 4 or 5.

* * * * *